US006564336B1

(12) United States Patent
Majkowski

(10) Patent No.: US 6,564,336 B1
(45) Date of Patent: May 13, 2003

(54) FAULT TOLERANT DATABASE FOR PICTURE ARCHIVING AND COMMUNICATION SYSTEMS

(75) Inventor: Gerald Edwin Majkowski, Kildeer, IL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/474,394

(22) Filed: Dec. 29, 1999

(51) Int. Cl.$^7$ .............................. H02H 3/05; G06F 12/00
(52) U.S. Cl. ................................ 714/4; 714/6; 707/204
(58) Field of Search ............................. 714/4, 5, 6, 11, 714/12, 13, 39, 43; 707/201, 202, 204; 711/154, 170, 171

(56) References Cited

U.S. PATENT DOCUMENTS

| | | | |
|---|---|---|---|
| 4,652,999 A | | 3/1987 | Higashi et al. |
| 5,781,910 A | * | 7/1998 | Gostanian et al. ............ 707/10 |
| 6,145,094 A | * | 11/2000 | Shirriff et al. .............. 709/226 |
| 6,243,805 B1 | * | 6/2001 | Mahurin ..................... 712/217 |
| 6,247,141 B1 | * | 6/2001 | Holmberg ..................... 707/1 |

OTHER PUBLICATIONS

Flavin Cristian, Understanding Fault–Tolerant Distributed Systems, Feb. '91, Communications of the ACM vol. 34, No. 2, p. 57–76.*
Kenneth Birman, The Process Group Approach to Reliable Distributed Computing, Dec. '93, Communication of the ACM vol. 36 No. 12, p. 37–52.*
PACS Basic Principles and Applications, H.K. Huang, (A. John Wiley & Sons Publication 1999): "Picture Archiving and Communication System Components and Industrial Standards", Ch. 7, pp. 177–198A.
PACS Basic Principles and Applications, H.K. Huang (A. John Wiley & Sons Publication 1999): "Image Acquisition Gateway", Ch. 8, pp. 199–231;A. John Wiley & Sons Publication 1999.
PACS Basic Principles and Applications, H.K. Huang (A. John Wiley & Sons Publication 1999): "Display Workstation", Ch. 12, pp. 305–342.

http://www.fujindt.com/medical/; Fujifilm, Medical Imaging—computed Radiography; author unknown, date unknown, printed on Nov. 18, 1999. Html pages: cr_process1; cr_process2; cr_process3; cr_process4; cr_process5; cr_process6: cr_basics; cr_whyfuji; advance; cr_synapse; crvsder; cr_application; cr_reference.

http://www.sybase.com/products/datamove/repsrver.html Sybase Replication Server—author unknown, printed Jan. 24, 2000.

*Continuous Availability, The Key to Sucess on E—street,* Sybase, Sep. 1999.

* cited by examiner

Primary Examiner—Robert Beausoliel
Assistant Examiner—Emerson Puente
(74) Attorney, Agent, or Firm—McAndrews, Held & Malloy Ltd.; Peter J. Vogel; Michael A. Dellapenna

(57) ABSTRACT

A fault tolerant database including one or more work stations (50–52) providing transaction data to be added to a database, including a primary network (100), a primary storage system (80) and a secondary storage system (90). A primary server (10) is coupled to the primary network (100) and receives the transaction data which is stored in the primary storage system. At time intervals, the primary server (10) transfers the transaction data from the primary storage system for storage in the secondary storage system. The primary server (10) defines a port for establishing connections to the work stations through the primary network (100). A secondary server (20) is coupled to the primary network (100) and receives transaction data from the primary server which is stored in the secondary storage system (90). The secondary server (20) also defines a port for establishing connections to the one or more work stations (50–52) through the primary network (100) in the event of a failure of the primary server (10).

17 Claims, 5 Drawing Sheets

TSS Operation After Primary Database Failure

TSS Operation After Primary Server Failure

FAULT TOLERANT DATABASE FOR PICTURE ARCHIVING AND COMMUNICATION SYSTEMS

BACKGROUND OF THE INVENTION

This invention relates to picture archiving and communications systems, and more particularly relates to techniques for handling faults in the databases of such systems.

Picture archiving and communication systems (PACS) employ databases for cross-referencing examination sequences, images, transactional data, physician references, patient references, etc. Transactional data may include exams ordered or available, exams viewed and dictated, etc. Currently the systems operate with no backup of the data, other than conventional periodic tape back up. As a result, there is no way for the systems to continue operation immediately in the event that there is a hardware failure. In addition, data recently put into the system may be lost. This invention addresses these problems and provides a solution.

BRIEF SUMMARY OF THE INVENTION

The preferred embodiment is useful in a picture archiving and communication system for providing a fault tolerant database. In such an environment, transaction data to be added to the database is provided, preferably by work stations. The database is stored in a primary storage system and also is stored in a secondary storage system. First connections enabling the transfer of the transaction data to the storage system are established. The transaction data is transferred to the primary storage system along a first path, and then is stored in the primary storage system, preferably by a first server. At time intervals, transaction data is read from the primary storage system and transferred for storage in the secondary storage system, preferably along a network. The transaction data then is stored in the secondary storage system, preferably by a second server. Second connections are established enabling the transfer of the transaction data to the secondary storage system without first storing the transaction data in the primary storage system in the event of a failure of the database stored in the primary storage system or the first server. By using the foregoing techniques, a security back up can be provided, as well as the cross checking of posting to parallel databases.

DETAILED DESCRIPTION OF THE INVENTION

The preferred embodiment provides users of a picture archiving and communication system (PACS) with a safety net for information management server (IMS) database failures. In some PACS, there is only a single IMS which makes the database processed by the IMS a critical component. If the database fails, the enterprise loses all operation until the problem is resolved. The preferred embodiment provides a means for a site to continue operation if such a failure should occur.

The preferred embodiment enables a warm standby switchover in the event of a database failure by maintaining an active copy of the IMS and master database that is no more than 5 minutes old under normal operating conditions. If the primary database fails, client workstations all are switched to the database copy for continued operation. This preferred embodiment has three major components:

(1) An active copy of the database kept on a redundant database server.

(2) Data Duplication Software (DDS) that copies database transactions from the primary to the secondary server; and (3) Socket Switching Software (TSS) that moves client workstations from a failed database server to the secondary server by controlling all database connections. The TSS also monitors the state of the primary and secondary databases and executes a switch when a failure occurs.

Figure 1:
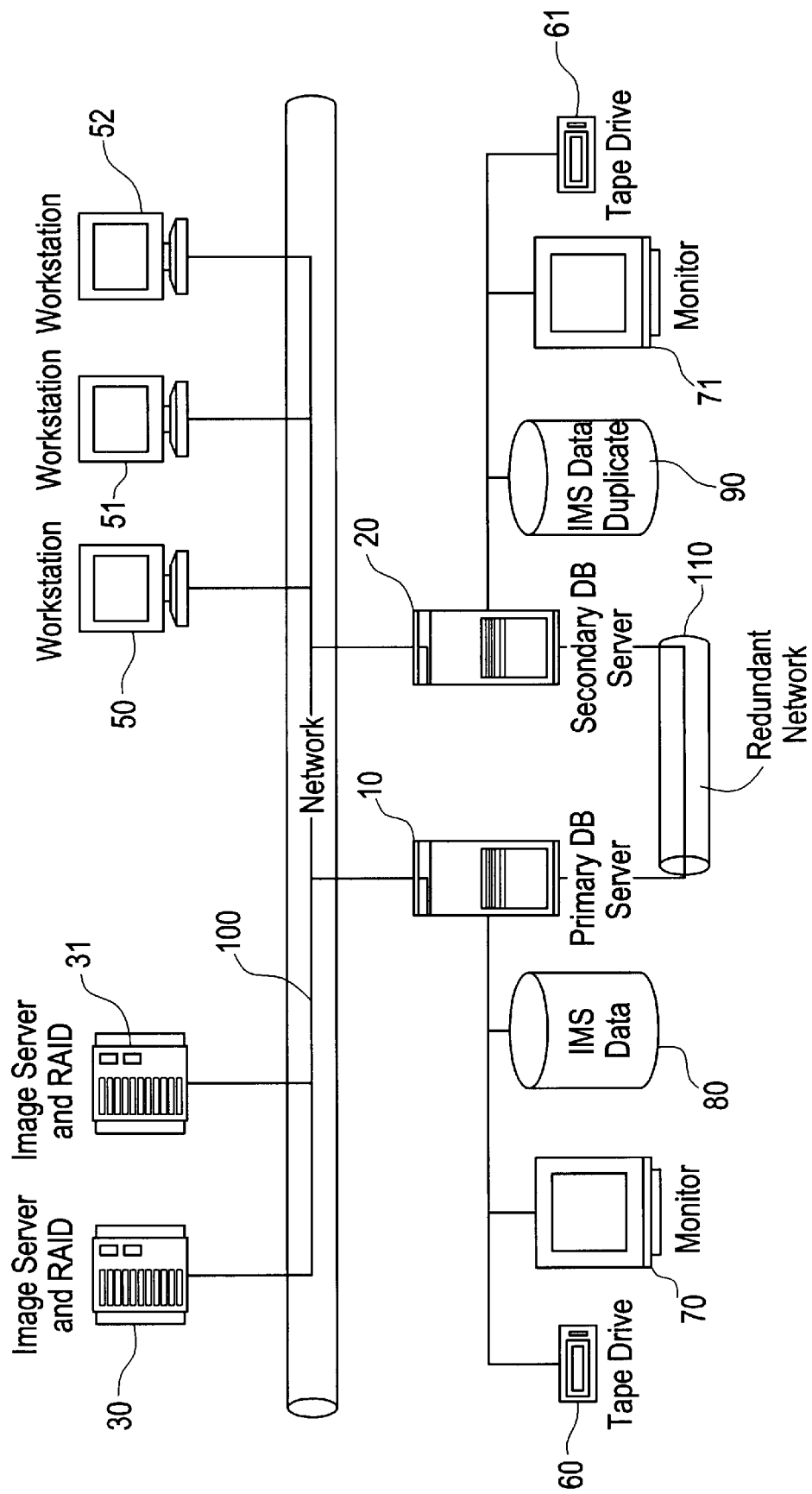
FIG. 1 is a schematic block diagram of a preferred form of fault tolerant database system according to the invention.

Referring to FIG. 1, the preferred embodiment includes a primary database server 10 and a secondary (redundant) database server 20. The preferred embodiment also includes image servers and redundant arrays of inexpensive disks (RAID) 30–31, client work stations 50–52, conventional tape drives 60–61, monitors 70–71, a primary server storage system 80, a secondary server storage system 90, a primary network 100 and a secondary (redundant) network 110, all interconnected as shown. Secondary server 20 is an exact copy of the primary server 10, both of which are high performance, large database servers.

Redundant network 110, between primary server 10 and secondary server 20, enables the TSS software to reliably determine the state of both servers in the event of a network failure. Redundant network 110 is fully independent of primary network 100. This means that they do not share network hardware, cabling or wiring conduit. If cost is an issue, redundant network 110 could be a slow, temporary network, such as a dialup phone line. The details of the use of redundant network 110 are described below.

Although FIG. 1 depicts primary network 100 as a simple Ethernet backbone, it also may be implemented by a more complicated network configuration that may already have its own redundancy.

Duplication of all IMS data is accomplished using a software application that performs very frequent transaction dumps of primary server 10 across network 100 to secondary server 20. Under normal operating conditions, these transaction dumps are loaded as soon as they are available to secondary server 20. If primary server 10 then becomes unavailable, secondary server 20 lags the primary server no more than the amount of time between transaction dumps. Secondary server 20 also is available for nearly immediate access.

Figure 2:
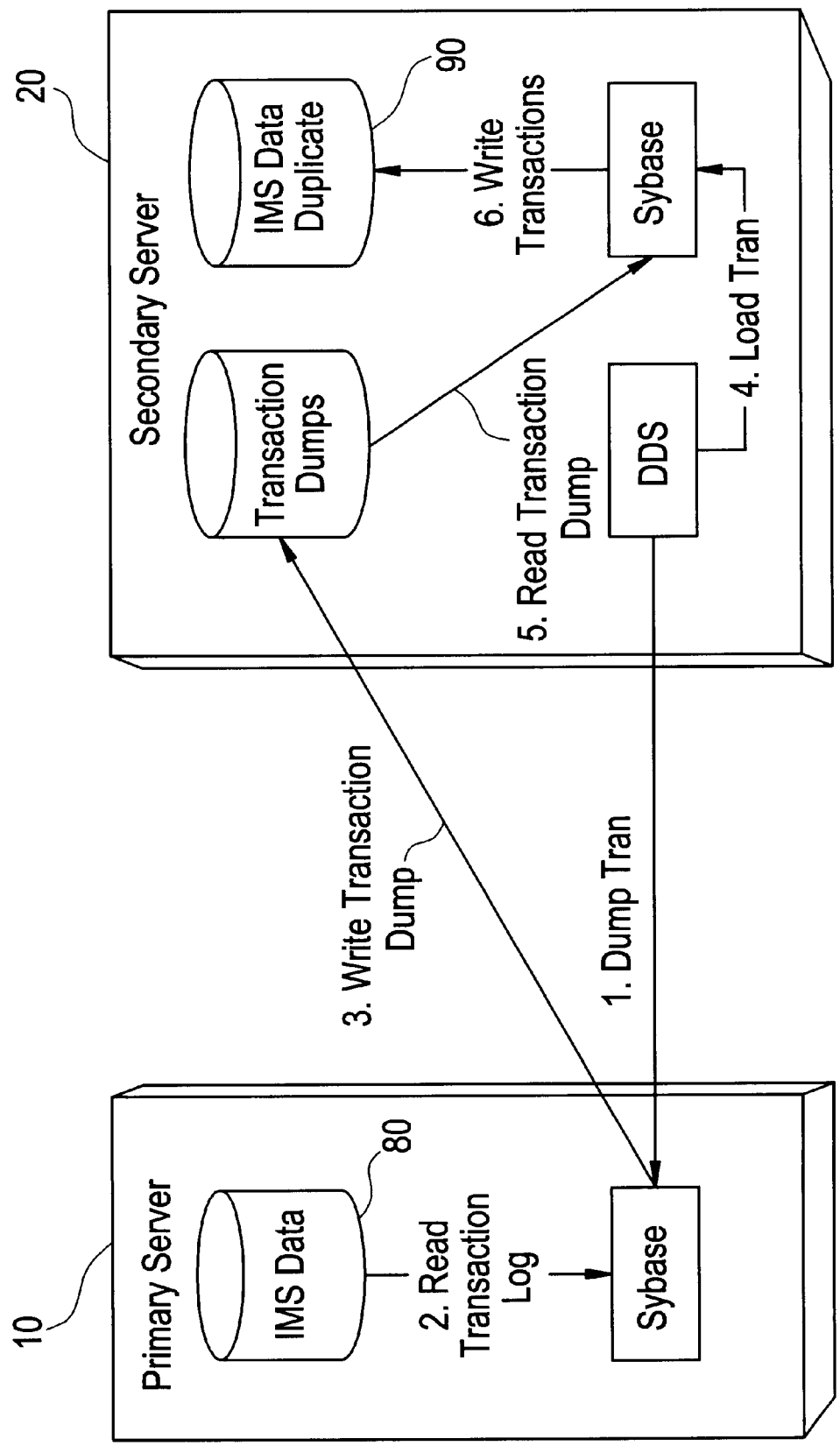
FIG. 2 is a flow diagram illustrating the flow of data between various components shown in FIG. 1.

FIG. 2 shows the flow of commands (double arrow) and data (single arrow) for the operation of the DDS. Sybase software is loaded on both server 10 and server 20 and is used for normal database operations, database maintenance operations and for the transaction dumps used by the DDS.

The data dumps could occur as frequently as every one to five minutes without adversely affecting the system performance of primary server 10 while it is in use. The time parameter is configurable to allow each site to make adjustments for performance purposes. The lower the frequency, the higher the chance that data entered just before the fault will be lost. Appropriate minimum and maximum frequencies may be established by a user.

Transaction data dumps are performed across network 100 and stored on secondary server 20 to ensure that all of the dumps are available if the primary server fails. This will enable the DDS to complete the duplication in the event that the primary server fault is due to a catastrophic hardware failure.

The DDS monitors the disk space available on the secondary server storage 90, and alerts an administrator if space becomes scarce by generating a signal. This signal informs the administrator to begin a procedure to move old transaction dumps to tape 61 and free up disk space in storage 90. DDS also may automatically move batches of transaction dump files to tape 61 on a scheduled interval. By default, DDS will alert the administrator when the disk space of storage 90 is at 80% capacity. This capacity parameter is configurable. Also, DDS will stop transaction dumps and alert the administrator once the capacity has reached 88%. Though this effectively disables fault tolerance, it will prevent a situation where Sybase "completes" a dump that is never written to disk but is not known to have failed.

Transaction data dumps must be loaded onto secondary server 20 and stored in secondary storage 90 in the exact order in which they were dumped or read out of storage 80. If the order is lost, the duplicate database in storage 90 must be reloaded which requires making a new full dump of the primary database and restarting the full database load process. Because of this, the dump and load duplication process is tightly controlled by the DDS to keep track of each dump and to maintain the order of the transaction dump files. It is important to maintain these dump files, because until the next full dump is made, the transaction dump files are needed for recovery in the unlikely event that both the primary and secondary database servers 10 and 20 are lost.

The DDS also is used for database maintenance. Full database dumps are made from secondary server 20 as long as the system remembers between which transaction loads the backup was made.

The FIG. 1 system has a regular schedule of switching between the primary and secondary servers which serves multiple purposes:

(1) It increases the likelihood that secondary server 20 is actually an operational server in the event of a failure of server 10. Because it could be months or even years before server 20 would be needed for actual fail over service, an undetected error could be catastrophic. A regularly scheduled switchover enables server 20 to be brought to a known good state on a regular basis.

(2) It ensures that database corruption is not creeping into the primary server and setting it up for a failure. Since full backups are taken from secondary server 20, the DBCC's will be run from these secondary backups only. Although this ensures that the secondary is clean and able to handle a primary failure, it leaves the primary without a recent consistency check. When the planned switchover to the secondary takes place, the system will be starting with a known clean system. DBCCs perform the function of a database consistency check; this is a Sybase procedure. The DBCC server is a database server devoted to performing DBCC's. This is an existing system procedure which offloads this resource intensive task from the normal database.

Planned switchovers should not be a frequent event because once the secondary server becomes the primary server, it will be necessary to reinitialize the "new" secondary by performing a full load from the most recent full dump of the old secondary server. Then the secondary needs to be brought up to the current state of the primary by loading all of the transaction dumps that occurred since the full dump that was loaded. As a result, it is best to perform a switchover immediately after a full dump of the old secondary server. Also, because this puts the system at risk with no secondary during this process, the procedure should be infrequent, such as once every month to every quarter. For these same reasons, the procedure should also be done during maintenance hours.

Secondary server 20 is not immediately available for recovery while a backup is in progress. The DDS takes this fact into consideration by continuing to perform the dumps from primary server 10 while the backup is in progress. These dumps are not applied to secondary server 20 until the backup operation is complete. If a fault on primary server 10 occurs during the operation, the backup operation immediately is canceled, the waiting transaction dumps are applied, and secondary server 20 is made available.

The initialization, maintenance and switchover of a fault tolerant system is conducted as follows, assuming a running system that has an existing DBCC on primary server 10.

Secondary Server Setup

Secondary server 20 is set up with the database and system software. A normal backup and DBCC check is performed on the running system using the existing DBCC server. The backup from the DBCC is loaded onto secondary server 20. Once server 20 has caught up to the latest transaction dump from the server 10, the fault tolerant system is in place.

System Maintenance

Regularly scheduled tape backups of the transaction dumps are initiated by DDS. The system may be configured to automatically perform the tape backups on a scheduled interval. These tape backups are a file copy of a set of transaction dumps to backup tape 61. The set of files to be copied is selected by the DDS. This set consists of all the transaction dumps that have been applied to secondary server 20 since the previous table backup of the transaction dumps. The full dump plus these incremental dumps can be used for off-sight storage. The DDS keeps track of which transaction files have already been dumped to tape.

When the scheduled maintenance time for full backup occurs, it is initiated by a command at the DDS. Alternatively, the system can be configured to automatically start the full backup at a scheduled interval. The full backup is taken from secondary server 20. When the full backup is complete, the DDS initiates a load of the DBCC server on the secondary server 20. When the load is complete, it initiates the DBCC check. During the maintenance operation, the DDS continues to perform the regular transaction dumps from primary server 10, but it does not apply them to secondary server 20 until the backup operation is complete. If a fault occurs on primary server 10 while the maintenance operation is in progress, the backup operation is aborted, the available transaction dumps are applied to secondary server 20, and secondary server 20 becomes the primary server.

Switchover

When a scheduled switchover occurs, it is initiated at the TSS described below. The details of the switchover also are described below. After the DDS performs the final transaction dump on primary server 10 and applies it to secondary server 20, the secondary becomes the primary. At that point and until the old primary is reinitialized for fault tolerance, there is no secondary server. In spite of this, the DDS begins the transaction dumps from the new primary. These dumps cannot yet be applied to the new secondary.

The DDS then is started on the old primary. When it is ready, the operator then issues a command that begins the re-initialization. First, this transfers the DDS operation from the current primary to the old primary and automatically moves the transaction dumps that have been made since the switchover from the new primary to the old primary.

Then to reinitialize the old primary for fault tolerance as the new secondary, the most recent full dump from the last maintenance operation is applied to the old primary. When this is complete, the DDS applies all transition dumps since the last full backup to the old primary. Then it applies all the transaction dumps made from the new primary since it became the primary server. When the DDS has caught up restoring all the needed transaction dumps, the old primary is ready for operation and it becomes the new secondary.

The preferred embodiment protects against the corruption of the primary database by keeping a clean copy of the primary database on secondary server 20. If the primary database becomes corrupted to the point of failure, the secondary database takes over. To ensure that the secondary database is not corrupt, a DBCC is performed after each full backup of the secondary on the secondary's DBCC server.

The preferred embodiment provides a means to move client work station connections from a failed system to the backup system. To accomplish this, Transmission Control Protocol (TCP) socket switching software (TSS) is used.

The primary TSS runs on primary server 10 and provides a TCP port listening for client work station connections. Client work stations point to this port rather than to the database. When the TSS receives a connection from a client work station, such as work stations 50–52, it opens a connection to the current running database and passes all packets from the client to the server and vice versa. A secondary TSS also is running on secondary server 20 as a backup for a failure of the primary TSS or entire primary server 10. The secondary TSS is dormant except for periodically monitoring the state of the primary TSS.

Figure 3:
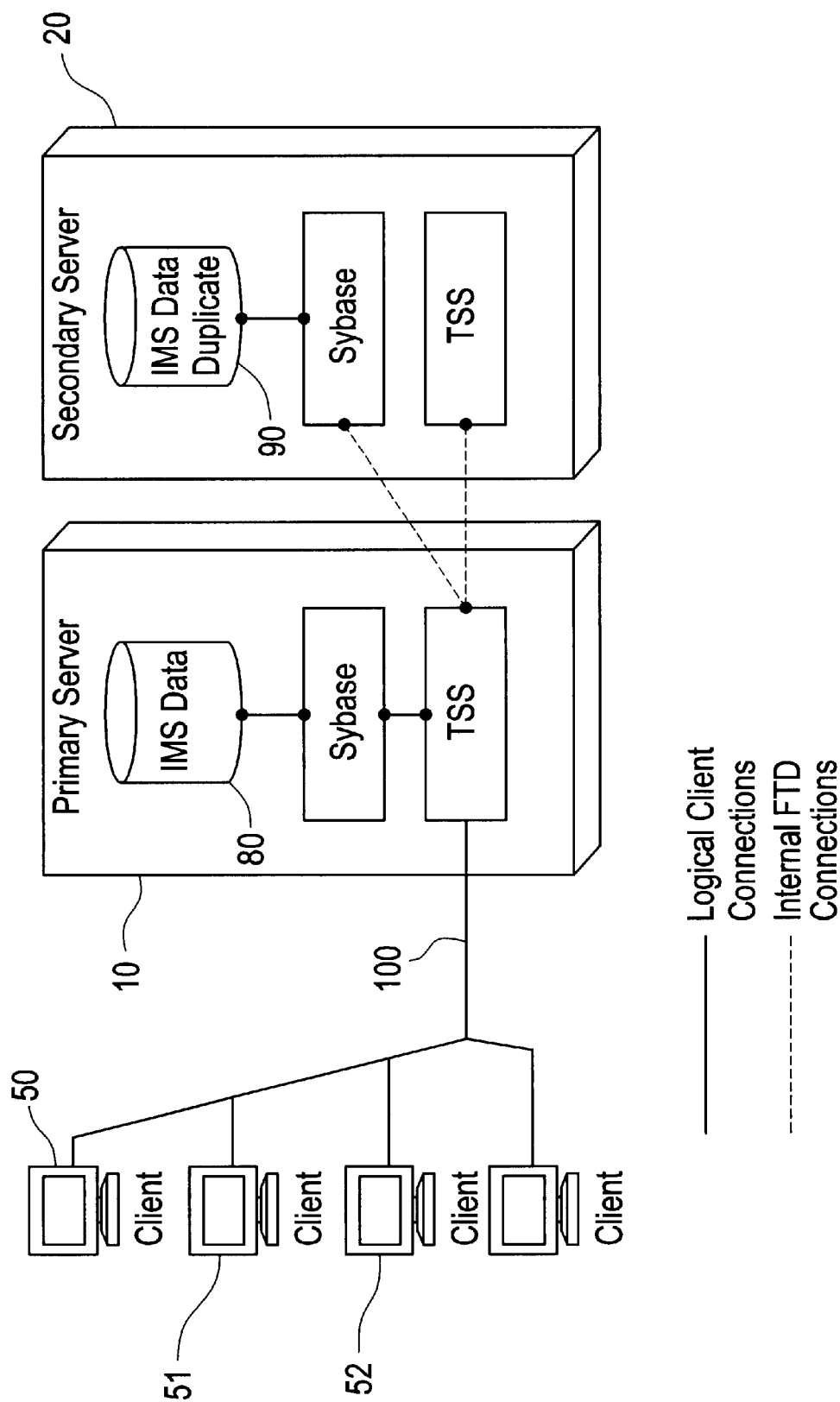
FIG. 3 is a schematic block diagram illustrating the normal operation of a preferred form of socket switching software (TSS).

The solid lines in FIG. 3 show the logical data connections from client work stations through the TSS to the primary data server 10 during normal operation. The dashed lines indicate that the primary TSS has connections to the secondary TSS and database for monitoring purposes, but these connections are not open for client use.

The TSS looks for failure in two ways. First if a client-server communication results in an exception on the server side, this is considered a fault. The TSS waits for a certain number or pattern of exceptions before switching to secondary server 20. Second, the TSS maintains its own set of connections to the available servers to monitor their availability.

Figure 4:
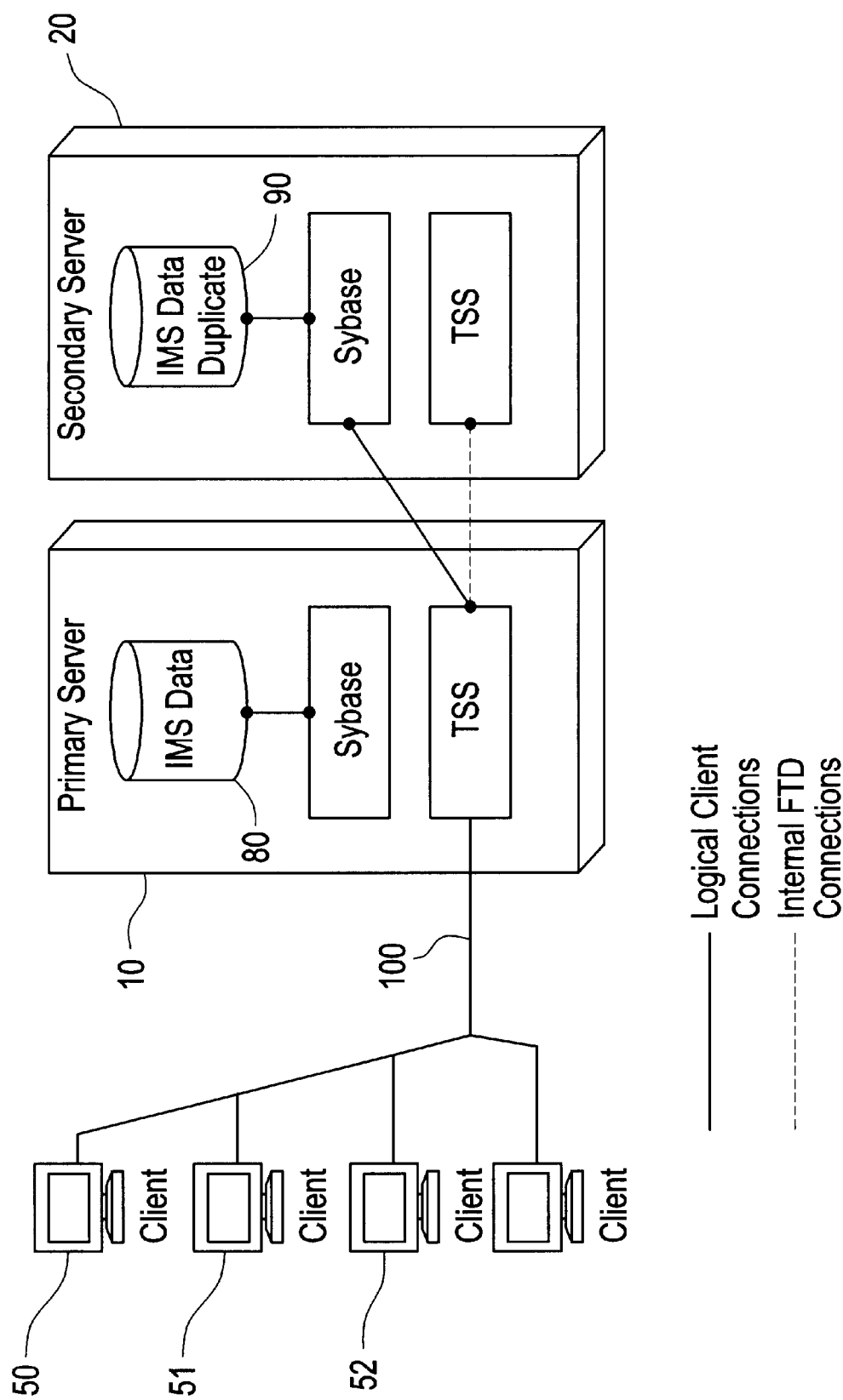
FIG. 4 is a schematic block diagram showing the TSS operation after primary database failure.

When the TSS determines that a server fault has occurred, it closes all connections. This forces the clients to reconnect and retry any in-progress transactions. When the clients reconnect, they are connected to secondary server 20 FIG. 4 shows how the clients are connected to secondary server 20 throughout the TSS after the fail over of the database on primary server 10. The TSS on primary server 10 is still in use if the entire server is not down.

Figure 5:
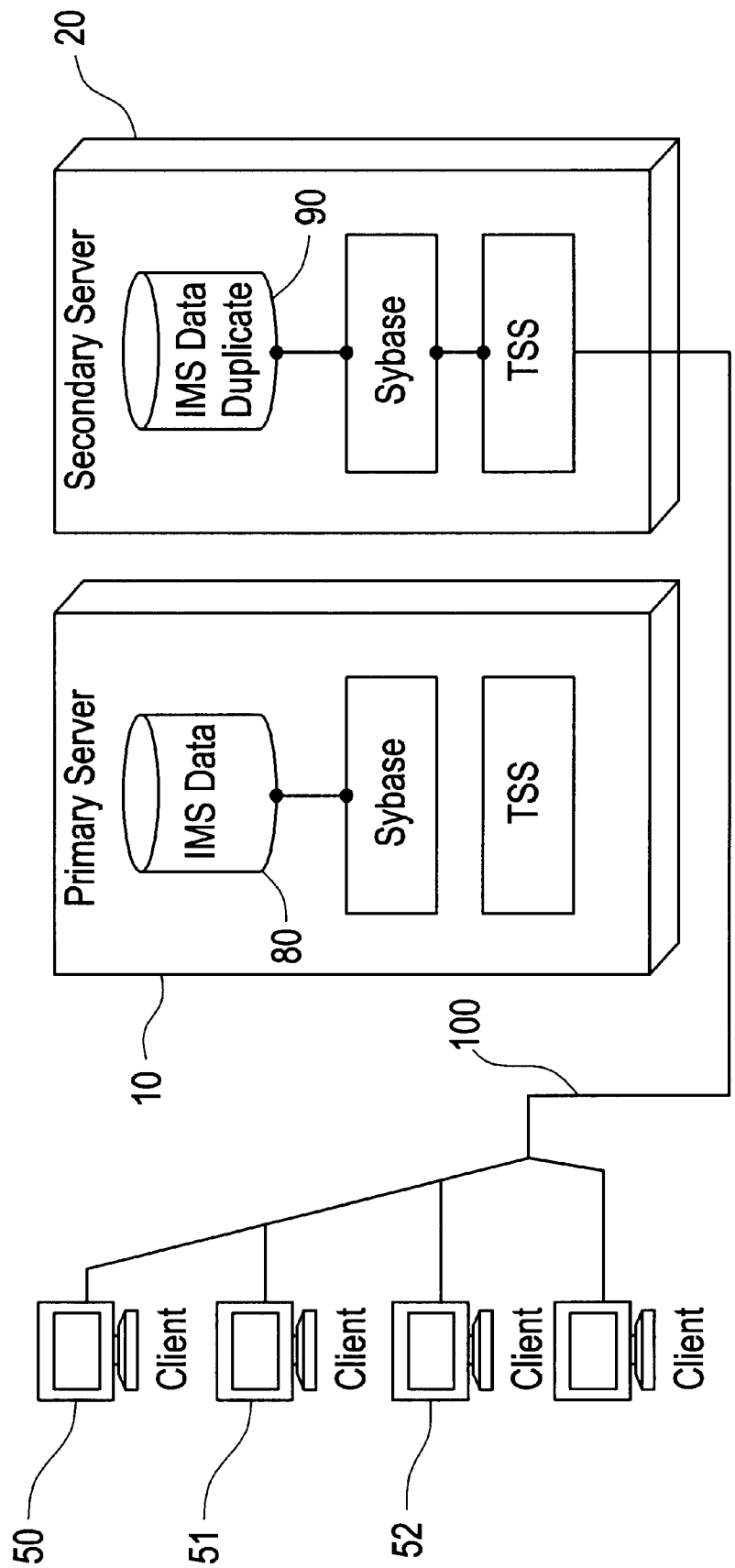
FIG. 5 is a schematic block diagram showing TSS operation after primary server failure.

If the entire primary server fails, the clients connect to the secondary database in storage 90 through the secondary TSS on secondary server 20. This situation is depicted in FIG. 5.

The TSS needs a direct communication with the DDS to provide a smooth switchover from the primary to the secondary server. This is accomplished through a TCP socket connection between the TSS and DDS. This communication is needed whether the switchover is planned or due to a failure. The following scenario describes the sequence of events that take place when a switchover occurs.

1. A switchover is initiated at the TSS.
2. All client connections to the TSS are closed.
3. The TSS sends a "switchover initiation" message to the DDS.
4. The DDS executes one last transaction dump of the primary server 10.

If this dump is not successful because the IMS database on primary server 10 is no longer available, the DDS attempts to perform a transaction dump with no truncate. This dump can be performed even if the IMS database is not available, though the master database must still be running. If the master database also is down, it is not possible to recover the transactions that were completed after the previous transaction dump in a timely fashion.

5. The DDS loads any remaining dumps to the secondary server.
6. When all transaction dumps have been loaded on secondary server 20, the DDS sends a "ready for switchover" message to the TSS.
7. The TSS opens connections to secondary server 20 for all requesting client work stations.
8. The TSS starts up any required server software, like the IMS cache monitor, if needed.
9. The DDS begins processing transaction dumps on the new primary server.
10. The TSS sends an alert notification indicating that the switchover occurred.

There can only be one primary server at any time. If any situation resulted in the operation of two primary servers, this would result in divergent databases.

As described in the previous sections, after the switchover is complete, the old primary is not immediately available as a secondary server. It is at this point that the old primary is reinitialized for service as a secondary.

During normal fault tolerant operation the DDS is run on secondary server 20. This ensures continued operation in the event that a failure occurs on primary server 10, and it is fully non-functional. When a switchover takes place, the secondary database becomes the primary and the DDS on the new primary server hardware continues to serve the system. Whether or not the system is served by the TSS on the primary or secondary at this point depends on the type of fault, as described above. Though this non-standard configuration is acceptable at the time of failure, it is not desirable when the new secondary hardware is made available for service. When the new secondary is available, it is necessary to move the operation of the DDS to the new secondary. This ensures that the system again is able to handle a failure of the primary server. Also, if the TSS is still running on the failed primary, it's functionality must be transferred to the TSS on the new primary. Both the DDS and TSS must be able to transfer their functionality to a new server with little or no interruption in service.

Clients are able to point to multiple TSS servers on different machines. The Sybase interfaces files of the clients is used to provide this capability. The clients' access through the TSS, which provides central control of all connections, is a feature which enhances the reliability of the system.

During normal operation, only the primary TSS running on primary server 10 actually services client requests. The secondary TSS continues to run in a standby mode in case the primary TSS becomes incapable of servicing clients.

Both TSS servers need to know the state of the system and maintain a constant communication with each other to operate properly. This operation avoids database divergence. The next section describes how the TSS servers coordinate their operation.

Each TSS uses a token file located in its home directory to determine if it is a primary or secondary server. The token files contain the following information at a minimum:
(1) A token file version number which verifies that the token file can be used with the current version of the software.
(2) A token type: primary or secondary.
(3) A startup and shutdown flag which enables the TSS to know if the last shutdown was a clean shutdown.
(4) The address of the current primary database.

The token files are created at installation in the following manner:
(1) First, each TSS must be configured to know the address of its companion TSS server.
(2) When the TSS is started, if it does not have a token file, it will not begin to service any requests.
(3) When the installer is ready to specify a primary TSS, both TSS servers must be started. The installer then executes an "initiate primary" command at the appropriate server.
(4) Upon receiving the "Initiate primary" command, the TSS first attempts to contact its companion server. If it cannot contact its companion, it alerts the installer and aborts the operation. If it does contact the companion, it sends a "create secondary token" command to the companion server.
(5) When the companion TSS receives the "create secondary token" command, it creates a secondary token file. After it has successfully created the file, it sends a completion response to the primary companion.
(6) When the primary TSS receives the completion response from the companion server, it creates the primary token and opens a port for client requests. If the primary TSS does not receive the completion response within a configured timeout period, or receives a failure response, it alerts the installer and aborts the operation.

On subsequent restarts, the TSS uses its token file to determine its role as primary or secondary TSS. The TSS startup proceeds through the following sequence of events:
(1) TSS reads its configuration file and token file. If either file does not exist, the TSS sends an operator alert and will not service any requests.
(2) If the token file indicates that the previous shutdown was not a clean shutdown and that the TSS is a primary TSS, the TSS assumes that the companion TSS has taken over as primary TSS. It therefore automatically converts the file to a secondary TSS token file.
(3) The TSS then attempts to contact its companion TSS server and confirms its complementary role.
(4) If the companion TSS is found, the TSS takes one of the following actions:
  (a) If the companion TSS is determined to have the expected complimentary role, the TSS resumes the role indicated by the token file.
  (b) If the companion TSS is determined to have the same role, the TSS starts a negotiation so that one TSS assumes the appropriate complimentary role. The TSS also sends an operator alert, so that the operator can correct the roles of each TSS if the roles negotiated are not desirable.
(5) If the companion TSS is not found, the TSS takes one of the following actions while it continues to attempt contact with the companion server:
  (a) If its token file is a primary token file, it begins operation as a primary TSS and begins servicing connection requests.
  (b) If its token file is a secondary token file, it begins operation as a secondary. In this state, it is a dormant TSS. Without communication to the primary or operator interaction, it can never automatically assume the role of primary. But this state can only result from multiple concurrent system failures.

The primary purpose for on-going communication between the primary and secondary TSS is to detect failure of the primary TSS. The secondary TSS continually queries the primary TSS at regular intervals that do not exceed one minute. If a single query fails to get an appropriate response, the secondary TSS retries the query. If the retry fails, the secondary TSS attempts to query the primary on the secondary sub-network with multiple retries. If all attempts at contact fail, the secondary TSS assumes the role of primary TSS with connection to the current primary database. If multiple connection retries to the current primary database fail, the secondary TSS connects to the secondary database. All of these conditions result in operator alerts.

Since the secondary TSS constantly polls the primary for knowledge of its condition, the primary indirectly knows the state of secondary TSS. This enables the primary TSS to alert the operator if the secondary TSS does not poll within an expected interval. That interval should be greater than the secondary TSS polling interval mentioned above to allow for performance variations. But that interval should not be greater than twice the secondary TSS polling interval and is set at two minutes or less.

Those skilled in the art will recognize that the preferred embodiments may be altered without departing from the true spirit and scope of the invention as defined in the accompanying claims.

What is claimed is:

1. In a picture archiving and communication system, apparatus for providing a fault tolerant database comprising in combination:
  one or more workstations providing transaction data to be added to said database;
  a primary network;
  a primary storage system storing said database;
  a secondary storage system storing said database;
  a primary server coupled to said primary network receiving said transaction data over said primary network, transferring said transaction data to said primary storage system and at time intervals transferring said transaction data from said primary storage system for storage in said secondary storage system, said primary server defining a port for establishing connections to said one or more workstations through said primary network; and
  a secondary server coupled to said primary network receiving said transaction data from said primary server and transferring said transaction data to said secondary storage system for storage, said secondary server defining a second port for establishing connections to said one or more workstations through said primary network in the event of a failure of said primary server, said secondary server at regular intervals causing said second port to establish connections to said one or more workstations through said primary network so that the operability of said secondary server can be tested.

2. Apparatus, as claimed in claim 1, and further comprising a secondary network coupling said primary server and secondary server for enabling a determination of the state of the primary server and the secondary server in the event of a failure of the primary network.

3. Apparatus, as claimed in claim 1, wherein said secondary server monitors the space available in said secondary storage system and generates a signal when the space falls below a predetermined minimum.

4. Apparatus, as claimed in claim 1, wherein said time intervals are at least once every five minutes.

5. Apparatus, as claimed in claim 1, wherein said primary server transfers said transaction data to said secondary server in the exact order in which said transaction data is received from said primary storage system.

6. In a picture archiving and communication system comprising a primary storage system and a secondary storage system, a method of providing a fault tolerant database comprising in combination:

providing transaction data to be added to said database;

storing said database in said primary storage system;

storing said database in said secondary storage system;

establishing first connections enabling the transfer of said transaction data to said primary storage system;

transferring said transaction data to said primary storage system along a first path;

storing said transaction data in said primary storage system;

at time intervals reading said transaction data from said primary storage system;

transferring said read transaction data from said primary storage system for storage in said secondary storage system;

storing said transaction data in said secondary storage system;

establishing second connections enabling the transfer of said transaction data to said secondary storage system without first storing said transaction data in said primary storage system in the event of a failure of said database stored in said primary storage system, said second connections being established at regular intervals so that the operability of said first connections can be tested.

7. A method, as claimed in claim 6, wherein said system further comprises a second path enabling a determination of the state of said first connections and second connections in the event of a failure of said first path.

8. A method, as claimed in claim 6, and further comprising:

monitoring the space available in said secondary storage system; and generating a signal when the space falls below a predetermined minimum.

9. A method, as claimed in claim 6, wherein said time intervals are at least once every five minutes.

10. A method, as claimed in claim 6, wherein said storing said transaction data in said secondary storage system occurs in the exact order in which said transaction data is read from said primary storage system.

11. A method, as claimed in claim 6, further comprising:

identifying sets of said transaction data at regular intervals which have not been archived to a backup storage medium; and archiving said sets of said transaction data to said backup storage medium.

12. A method, as claimed in claim 6, further comprising archiving sets of said transaction data to a backup storage medium based on a scheduled interval.

13. A system for providing a fault tolerant database in a picture archiving and communication system, comprising:

a primary storage system coupled to a primary network and storing a database;

a secondary storage system coupled to said primary network and storing said database;

one or more workstations coupled to said primary network, said one or more workstations providing transaction data to be added to said database;

a primary server coupled to said primary network receiving said transaction data over said primary network, transferring said transaction data to said primary storage system and at time intervals transferring said transaction data from said primary storage system to said secondary storage system for storage, said primary server defining a first port for establishing connections to said one or more workstations through said primary network;

a secondary server coupled to said primary network receiving said transaction data from said primary server and transferring said transaction data to said secondary storage system for storage, said secondary server defining a second port for establishing connections to said one or more workstations through said primary network; and a secondary network coupling said primary server and secondary server for enabling a determination of the state of said primary and secondary servers, said secondary network being fully independent of said primary network.

14. The system of claim 13, said secondary server monitoring available space in said secondary storage system and generating a signal when said available space is within a range of less than a predetermined minimum and greater than zero.

15. The system of claim 13, further comprising a data backup device, said secondary server monitoring available space in said secondary storage system and transferring said transaction data to said data backup device when said available space is less than a predetermined minimum, said predetermined minimum being greater than zero.

16. The system of claim 13, further comprising a data backup device, said secondary server transferring said transaction data to said data backup device based upon a scheduled interval.

17. The system of claim 13, wherein said secondary network is a dialup phone line.

* * * * *